Sept. 16, 1969  G. M. MOTIS  3,466,937
LINEAR TO ROTATIONAL MOVEMENT CONVERTER
Filed Jan. 9, 1967  3 Sheets-Sheet 2
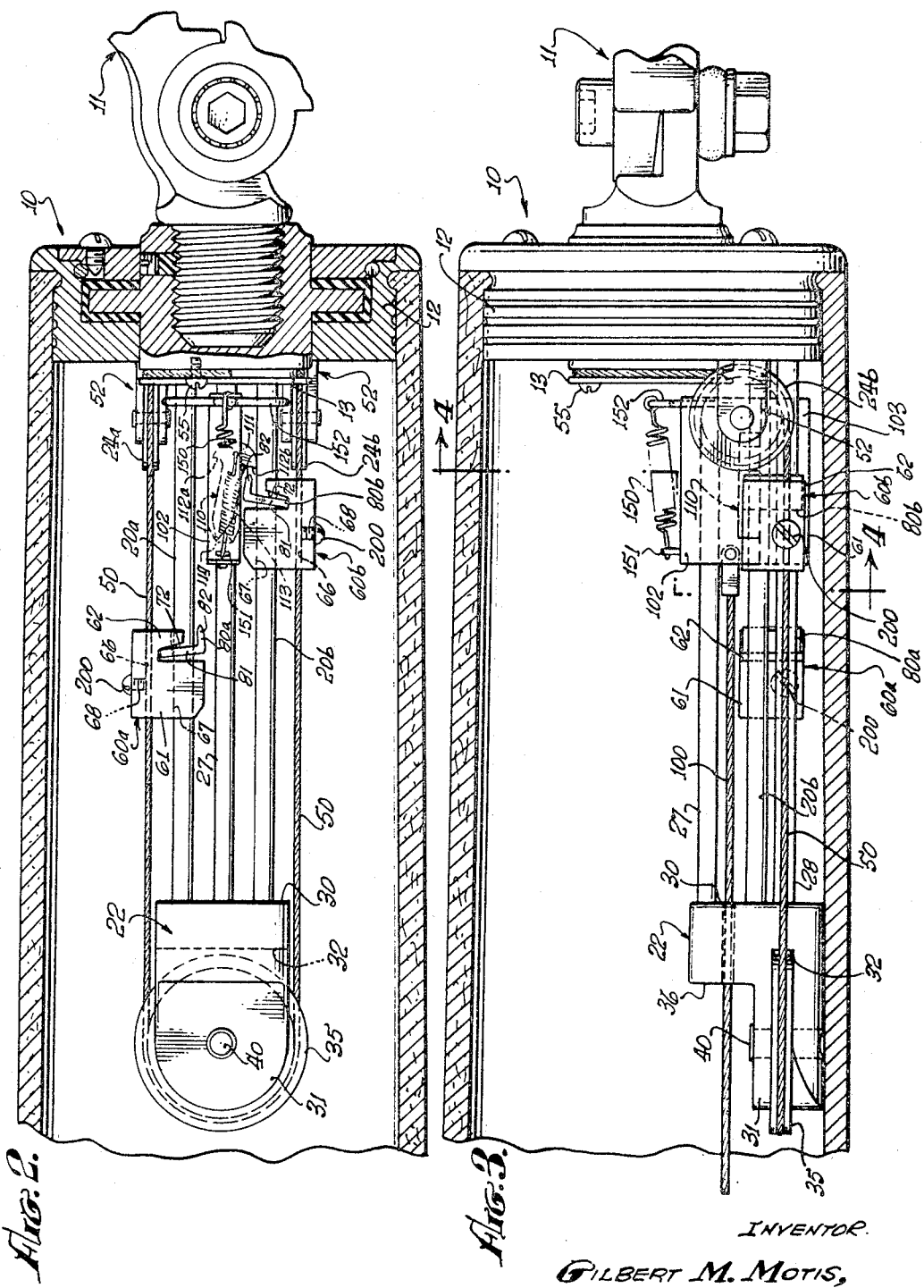
INVENTOR.
GILBERT M. MOTIS,
By His Attorneys
Spensley & Horn

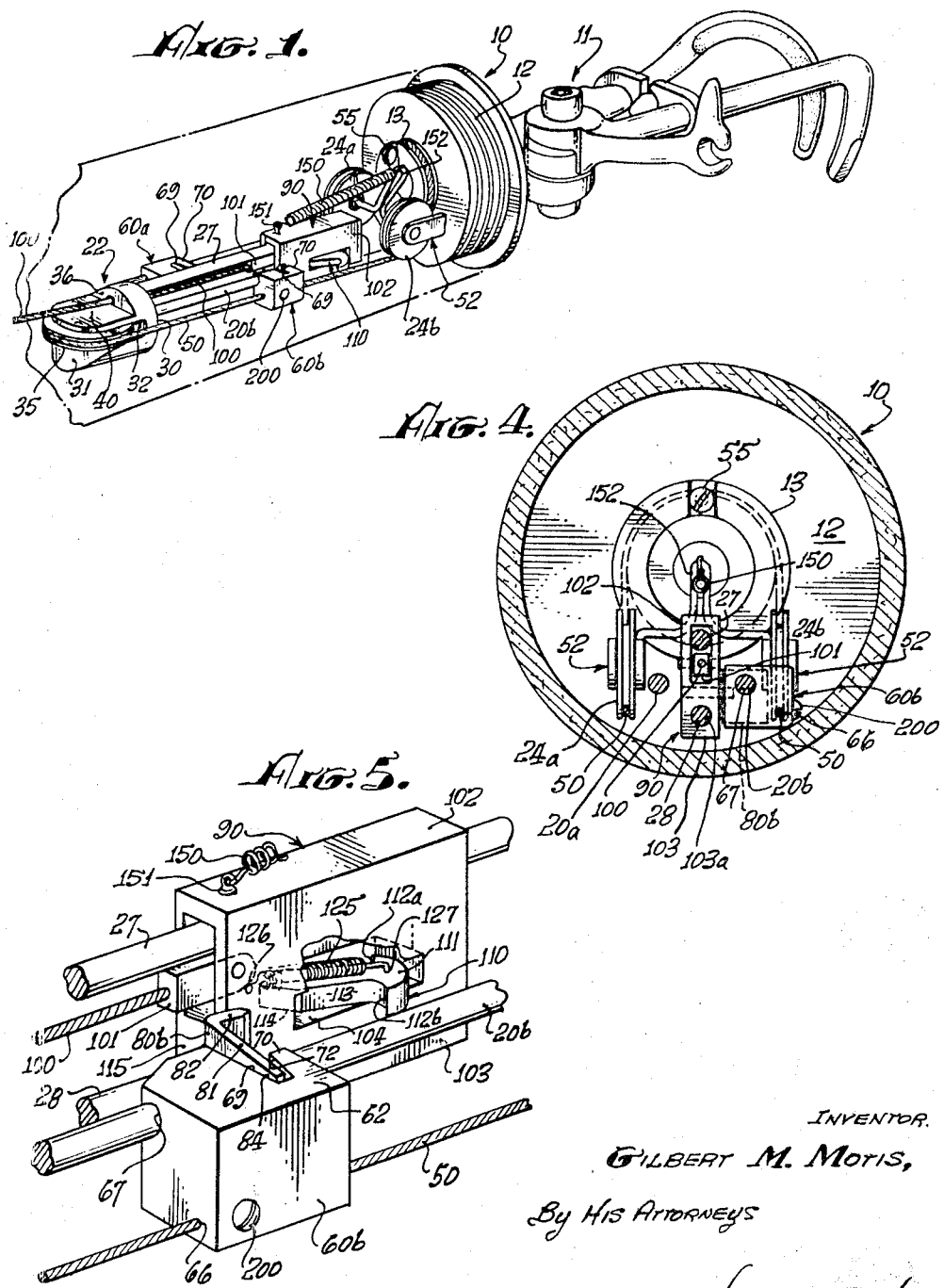

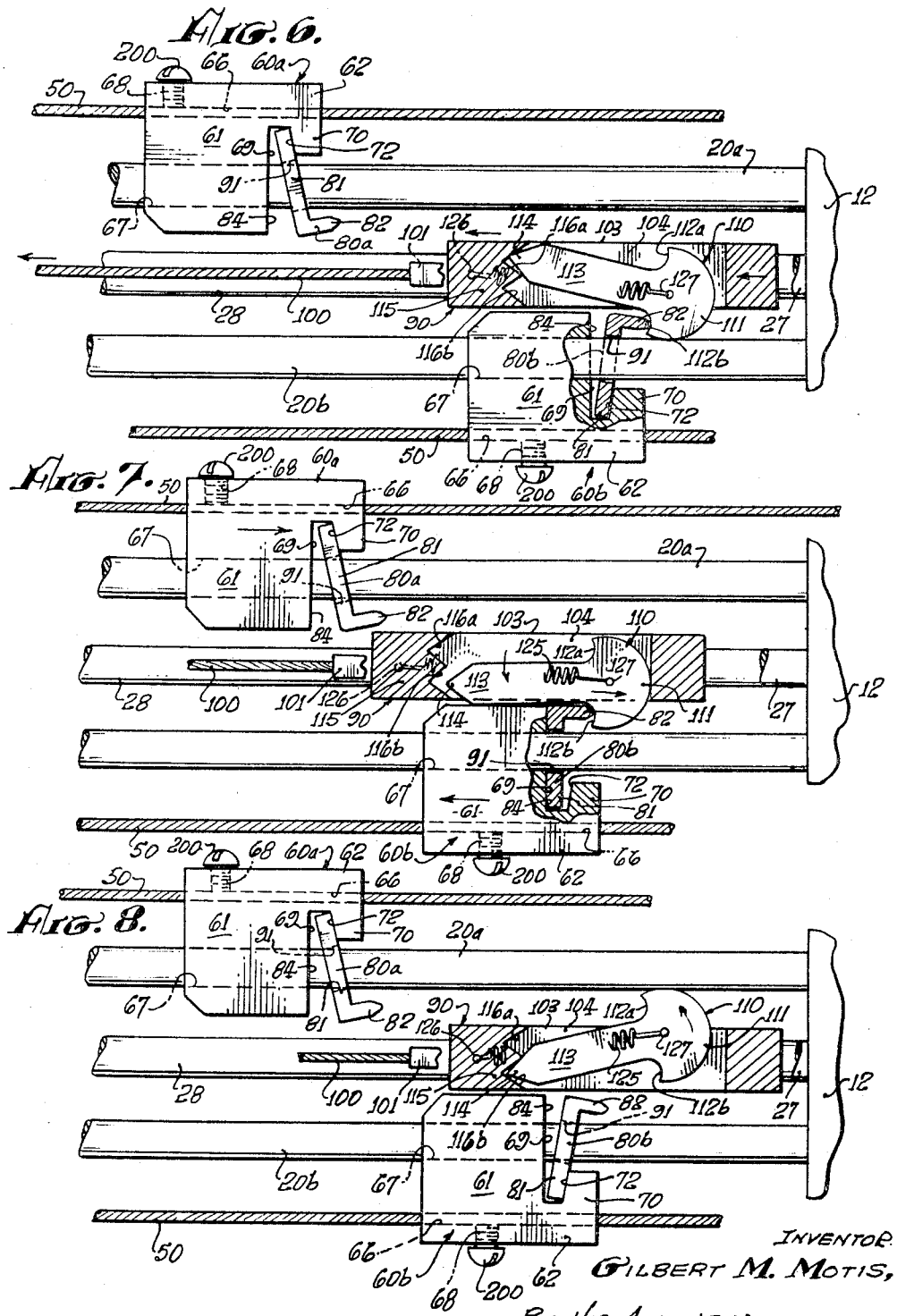

United States Patent Office 3,466,937
Patented Sept. 16, 1969

3,466,937
LINEAR TO ROTATIONAL MOVEMENT CONVERTER
Gilbert M. Motis, 19434 Roscoe Blvd.,
Northridge, Calif. 91324
Filed Jan. 9, 1967, Ser. No. 608,100
Int. Cl. F16h 29/02; A61f 1/06
U.S. Cl. 74—89.22                4 Claims

ABSTRACT OF THE DISCLOSURE

A conversion mechanism for converting linear motion to rotational motion is disclosed. The mechanism provides a conversion which has a reversible direction of rotation and in which the rotational position does not change when the linear actuating force is released.

---

This invention relates to a conversion mechanism for converting linear motion to rotational motion. More particularly, this invention relates to such a conversion mechanism in which the direction of rotation is reversible.

It has long been desired to have available a linear to rotational converter which is compact, and has the capability of reversing the direction of rotation. Further, it is desirable in such a converter that the position of a rotating member be capable of being locked or fixed at a particular desired rotational position.

Linear to rotational converters with the above advantages are useful in many different applications such as in control systems where it is desired to control a rotating vane or surface by means of an actuating rod or control cable. For example, in a missile ram air measuring system it may be desirable to rotate a tube or vane in response to a signal related to the missile trajectory. Such a signal may manifest itself to the object being rotated through a cable or rod which is linearly actuated. It may be further desired to have the rotation of the controlled object fixed at a desired position without changing position when the control is released. Such a mechanism could be actuated by a solenoid or other device capable of applying a momentary burst of energy.

A particularly useful application of such a converter mechanism is in a prosthetic device such as an artificial wrist. In a prosthetic wrist device, it would be most desirable and convenient to control the rotation of the prosthetic hook or artificial hand by an actuating cable. In prior art prosthetic wrist devices, the prosthetic hook, or hand is rotated manually by use of the opposite hand or is often manipulated against a firm surface such as a table or rail. It is clear that this creates a great inconvenience for the amputee since it requires either the use of both arms for a simple prosthetic hook (hand) rotation or else it requires the cumbersome placement of the prosthetic on a table or other hard surface which, of course, is often impractical if the artificial wrist and hand is grasping an object at the time the adjustment is desired. If a cable actuated converter were utilized, the cable could be easily and rapidly controlled, for example, by a shoulder connection.

Accordingly, it is an object of this invention to provide a linear to rotary converter which can be cable or rod actuated.

Another object of this invention is to provide a linear to rotary converter which has a reversible direction of rotation.

Another object of this invention is to provide a linear to rotary converter which is relatively compact.

Yet another object of this invention is to provide a linear to rotary converter in which the rotational position of a rotating member is not changed upon release of the actuating force.

A further object of this invention is to provide a linear to rotary converter in which the rotational position of a rotating member is fixed in position after release of the actuating force.

Another object of this invention is to provide a linear to rotary converter in which any rotational position may be selected.

Another object of this invention is to provide a linear to rotary converter which can achieve a selected rotational position by a momentary application of actuating energy.

A further object of this invention is to provide a linear to rotary converter which is reliable in operation.

Another object of this invention is to provide a linear to rotary converter which is economical to manufacture.

Another object of this invention is to provide a linear to rotary converter which can be readily utilized in a prosthetic device.

The invention herein is a converter or conversion mechanism which converts linear movement to rotational movement. The mechanism comprises a linear cable drive which drives a pulley to convert the linear motion to rotary motion. The cable drive is actuable in two directions and thus, the direction of rotation is reversible. Two lock assemblies are provided on the cable of the cable drive. The locks move with the cable and lock the cable to lock rods when the cable drive is not under actuating force. A sliding alternator assembly which is spring biased causes the cable drive and derivatively the rotary movement to reverse direction upon reactuation, that is, after the drive has been actuated and the actuating force removed or released. The alternator operates by means of a double-clawed pawl which is spring biased and which engages one of the lock assemblies when one of the claws contacts one of the locks. Upon release of the actuating force the claw through its spring bias retracts and upon reactuating of the cable drive, the other claw engages the other lock and reverses rotational direction. The alternator which operates the cable drive is itself driven by an external drive unit which may be a cable, rod, or the like.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a perspective drawing showing the invention herein as incorporated into a prosthetic wrist device;

FIGURE 2 is a top view of the embodiment of the invention as shown in FIGURE 1;

FIGURE 3 is a front view of the embodiment of the invention as shown in FIGURE 1;

FIGURE 4 is a view taken along the line 4—4 of FIGURE 3;

FIGURE 5 is a fragmented perspective view of the alternator and lock arrangement of the embodiment of the invention as shown in FIGURE 1;

FIGURE 6 is a fragmented view of the mechanism of FIGURE 1 showing the cable drive locked in one direction and the alternator in position to unlock the lock contacting it;

FIGURE 7 is a fragmented view of the mechanism of FIGURE 1 showing the lock which is locked in FIGURE 6 unlocked and the cable drive unlocked in the direction indicated; and FIGURE 8 is a fragmented view of the mechanism of FIGURE 1 showing the cable drive again locked as in FIGURE 6 and the alternator set to engage the opposite lock.

Referring now to the drawing, a prosthetic device 10 incorporating the invention described herein is shown in FIGURE 1. A prosthetic hook 11 of conventional design is the device intended to be rotated by the invention herein. An artificial arm end plate 12 of conventional design provides support for the prosthetic hook 11. The prosthetic hook 11 is mounted through plate 12 by a coaxial shaft (not shown) which is bushed through the plate 12 by a nylon sleeve or the like, such that prosthetic hook 11 is free to rotate with respect to plate 12. The end of the shaft is fixed to drive pulley 13 which is coaxially affixed to the shaft and free to rotate with respect to plate 12. Thus, prosthetic hook 11 rotates exactly as does pulley 13. In the drawing, the linear motion to rotary motion converter comprises the pulley 13 and the mechanism rearward viewed with respect to plate 12 of prosthetic hook 11.

Two lock rods 20a and 20b are provided and extend rearward from the rear face of plate 12 to rear support member 22. The lock rods 20 are parallel and spaced apart. The spacing between rod 20 is not critical and is dictated only by convenience in packaging within the space allotted. The lock rods 20 are rigidly fixed in the facing surfaces of plate 12 and support member 22. The lengths of rods 20 are equal and are not critical. The length does, however, as will be described hereinafter, determine in the preferred embodiment what ultimate degree of rotation is available, and thus, for a specific application the length of rods 20 will be predetermined to allow the desired amount of rotation. The rods 20 are located proximate the edge of plate 12 to provide space for the idler pulleys 24 which will be described hereinafter. Located in a plane midway between rods 20 are an upper guide rod 27 and a lower guide rod 28. Guide rod 28 is located a slight amount closer to the edge of plate 12 than are rods 20. Guide rod 27 is located between the plane of rods 20 and the pulley 13 as can best be seen in FIGURE 4. The rods 27 and 28 are rigidly affixed as are rods 20 between the facing surfaces of plate 12 and support member 22. The rods 27 and 28 together with rods 20 provide a rigid and strong interconnecting structure for the motion converting mechanism. The support member 22 has a round front face 30 which, as discussed hereinabove, is the rear attachment point for rods 27 and 28 and rods 20. The rear portion 31 of member 22 has a transverse groove 32 machined therein. The depth of groove 32 is not critical and is made deep enough so that groove 32 may be fitted to an idler pulley 35 with sufficient clearance to avoid binding or sticking in operation. A portion 36 of portion 31 of member 22 is cut away to permit a straight cable draw as will be described hereinafter. Idler pulley 35 is pivoted to support member 22 by shaft 40. Idler pulley 35 rotates freely. A drive cable 50 runs in pulley 35. The diameter of pulley 35 is predetermined so that drive cable 50 will be spaced outwardly from rods 20 as can be best seen in FIGURE 4. Idler pulleys 24 are pivoted to frame 52 provided on the end plate 12. Idler pulleys 24a and 24b are parallel and spaced apart so that the pulley grooves are apart by the same amount as the diameter of the groove of idler pulley 35. The idler pulleys 24 are located so that the bottom of their grooves as viewed in FIGURE 1 are in the plane of the groove of idler pulley 35. Thus, as is readily seen, the idler pulleys 24 and 35 fix the drive cable 50 in a parallel relationship to the lock rods 20. The drive cable is fixed by screw 55 to the drive pulley 13. That is, the drive cable 50 proceeds in both directions from the point fixed by screw 55 under idler pulleys 24 and around idler pulley 35. Thus, if drive cable 50 is moved in either direction, the drive pulley 13 will rotate accordingly.

Lock assemblies 60a and 60b are affixed to cable 50 on each side of the mechanism as can be best seen in FIGURES 6 and 8. The lock assemblies 60 each comprise a main body section 61 and a depending lock section 62. The shape of the body section 61 is not critical and it is only necessary that the extent of section 61 be sufficient in the transverse direction to interconnect the rods 20 with the cable 50. In the preferred embodiment of the invention, the lock assembly 60 is formed from a generally block shaped piece of material. The assembly 60 has formed therein a passage 66 for the cable 50 and a passage 67 for the rod 20. The passages 66 and 67 are spaced apart and parallel. The passage 66 is cylindrical and is made in diameter substantially equal to but greater than the diameter of cable 50. The cable 50 is pulled through the passage 66 to a predetermined position and affixed in position by means of the threaded hole 68 and the setscrew 200 provided therefor. The passage 67 is cylindical and in diameter is substantially equal to but greater than the diameter of rod 20. The diameter of passage 67 is such so that when rod 20 is passing therethrough there is just sufficient clearance so that passage 67 and rod 20 are slidable relative to each other. Grooves 69 are formed in the assembly 60. The groove 69 is transverse to the direction of passages 66 and 67. The grooves proceed outwardly beyond passage 67 and stop short of passage 66. The front portion 70 of the assembly 60 is cut away so that no part of front portion 70 surrounds rod 20. As will be seen hereinafter, whether or not portion 70 surrounds rod 20 is not critical. The front surface 72 of groove 69 is slanted so that groove 69 becomes progressively wider as it progresses from the inside toward rod 20. Thus, as stated hereinabove, the extent of portion 70 is not critical, however, for ease of manufacture in the preferred embodiment, the portion 70 is cut away as described hereinabove.

Arranged in groove 69 is a lock 80. Lock 80 has a lock portion 81 and a hook portion 82. The portions 81 and 82 are at right angles to each other and for convenience are formed from a single strip of metal. Portion 81 extends from a point proximate the inside of groove 69 to a point proximate the end of rearward face 84 of groove 69. Hook portion 82 extends sufficiently to engage with the alternator 90 as will be described hereinafter. Portion 81 has a circular opening 91 formed therein. The diameter of opening 91 is substantially equal to but greater than the diameter of rod 20. Thus, as can best be seen in FIGURES 6 through 8, when portion 81 is bearing against the slanted surface of groove 69, the lock cannot slide in one direction on rod 20 and thus the lock assembly 60 and the cable 50 cannot move in one direction. Accordingly, the lock assembly 60a is a unidirectional lock and the lock 60b because of the reversal of the cable 50 around pulley 35 is also a unidirectional lock which acts in the reverse direction on the cable 50 to that of lock 60a.

The unlocking of one or the other of the locks 60 is achieved by the alternator 90. The alternator 90 transmits the actuating force to the mechanism. The primary actuating cable 100 which is affixed to attenuator 90 by a stud 101 which may be pinned or otherwise connected to the alternator 90 by a stud 101 which may be pinned may be pinned or otherwise connected to the alternator 90. The alternator is spring biased in the forward direction by means of spring 150. The spring 150 is fixed to the alternator shell 102 at the top thereof at point 151 and is fixed at its other end to bracket 152. Bracket 152 is for convenience formed as a loop in the axle of idler pulleys 24. The alternator 90 comprises a generally rectangular shell 102 which has a solid lower section 103. The lower section 103 has a flat upper inside surface 104 which provides a bearing surface for pawl 110 which will be described hereinafter. The section 103 has a cylindrical passage 104 formed therethrough in which lower guide rod 28 is fitted. The diameter of guide rod 28 is substantially equal to but less than the diameter of passage 104 with sufficient clearance so that the alternator 90 is slidable with respect to guide rod 28. Guide rod 27 is also slidable with respect to alternator 90. The guide rods 27 and 28 fix alternator 90 in the proper plane and guide the alternator 90 positively throughout its movement. Arranged to move generally transversely over surface 104 is a pawl 110. Pawl 110 has a rounded section 111 which forms rearward facing claws 112a and 112b. Depending from section 111 is a straight section 113 which extends rearwardly and terminates in a triangular pointed portion 114. The rear wall 115 of alternator shell 90 has formed on the inside surface thereof triangular grooves 116a and 116b which are shaped to connect in bearing engagement with pointed section 114 of pawl 110.

The length of pawl 110 is predetermined such that it is approximately equal to the distance between the innermost point of rearward wall 115 and the inside surface of front wall 102. This enables the pawl 110 to translate easily from groove 116a to groove 116b and vice versa. The pawl 110 is spring biased by a spring 125 which is fixed at one end 126 to a point beyond the triangular grooves 116 and at the other end 127 to a point on the pawl 110 which is approximately the center of the circle which is partially formed by portion 111 of pawl 110.

The length of pawl 110 is predetermined such that it is approximately equal to the distance between the innermost point of rearward wall 115 and the inside surface of front wall 102. This enables the pawl 110 to translate easily from groove 116a to groove 116b and vice versa. The pawl 110 is spring biased by a spring 125 which is fixed at one end 126 to a point beyond the triangular grooves 116 and at the other end 127 to a point on the pawl 110 which is approximately the center of the circle which is partially formed by portion 111 of pawl 110.

The operation of the invention can be best described by referring to FIGURES 6, 7 and 8 of the drawing. In FIGURE 6 the mechanism is shown with locks 60a and 60b both in the locked condition. Thus, cable 50 cannot be moved in either direction. The pawl 110 through claw 112b is in initial contact with lock 80b. The pawl 110 has its pointed portion 114 engaged by triangular groove 116a.

In FIGURE 7, the actuating cable 100 has been drawn rearwardly thus drawing the alternator 90 rearwardly and forcing the pawl 110 over the bias of spring 125 to the front wall 120. The actuating force applied by cable 100 is now transmitted through pawl 110 to lock 80b, drawing lock 80b away from the slanted groove wall 72 and against the straight groove wall 84. The central axis of opening 90 of lock 80b is now parallel to the lock rod 20b and because of the slight clearance between the opening 91 and rod 20b, the lock 80b and lock assembly 60b are now unlocked or slidable with respect to rod 20b. Thus, as long as cable 100 is drawn rearwardly, lock assembly 60b will also move rearwardly and draw cable 50 in the direction indicated in FIGURE 7 and cause the drive pulley 13 to rotate in a clockwise direction, looking toward the prosthetic hook 11 in FIGURE 1. Of course, maximum travel is limited by the distance available between plate 12 and support member 22. Because of the action of lock 80b on the claw 112b of the pawl 110, the pointed portion 114 of the pawl 110 is now in line with triangular groove 116b.

Looking now to FIGURE 8, the actuating cable 100 has been released. Thus, the alternator 90 acted upon by spring 150 returns to the most forward position. As soon as lock 80b goes out of contact with claw 112b of pawl 110, the spring 125 pulls pointed portion 114 of pawl 110 into engagement with triangular groove 116b by the action of spring 125 which exerts a force off center of the center line of the alternator. Accordingly, the claw 112a of pawl 110 is now in position to engage lock 80a and rotate the drive pulley 12 in a counterclockwise direction when the actuating cable 100 is again drawn. Until the cable 100 is drawn, the mechanism remains locked as discussed hereinabove.

The alternator 90 returns easily to its initial position when cable 100 is released because of the rounded portion 111 of pawl 110, the rounded surface passes easily without catching past the locks 80 and the lock assemblies 60. The beveled edge 160 of the lock assembly 60 makes the passage even more smooth.

In the preferred embodiment of the invention, all parts are made of metal, however, it is apparent that many different materials could be practicably utilized as, for one example, plastics.

It can be readily seen that a converter as described herein is especially suitable for use in a prosthetic device as shown in FIGURE 1. The actuator cable 100 may be connected to a shoulder harness of an amputee who can then operate the device simply with a shrug of the shoulder.

Thus, there has been described a novel linear motion to rotary motion converter which until actuated is locked in position and which when actuated drives in one direction and upon release of the actuating force and reactuation drives in an opposite direction.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A converter for converting linear motion to rotational motion comprising:
    (a) a drive pulley;
    (b) a drive cable for rotating said drive pulley;
    (c) an alternator for selectively alternating the direction of motion of said cable means, said alternator comprising a pawl, said pawl having a claw depending therefrom;
    (d) connecting means for connecting said alternator selectively to said cable means, said connecting means comprising a cable lock, said lock being adapted to engage selectively with said claw of said pawl, said lock being affixed to said cable; and
    (e) actuating means for actuating said cable.

2. A converter as claimed in claim 1, wherein said alternator comprises additionally spring means for biasing said pawl to a predetermined position when said claw is not engaged with said lock.

3. A converter as claimed in claim 2, comprising additionally:
    (a) a lock guide bar;
    (b) an alternator guide bar;

(c) said alternator and guide bars being parallel;
(d) connecting means for slidably connecting said lock to said lock guide bar; and
(e) connecting means for slidably connecting said alternator to said alternator guide bar.

4. A converter as claimed in claim 3, wherein said lock comprises a plate, said plate defining an opening therethrough, said opening being configured to the configuration of the transverse cross-section of said lock guide bar, said opening, at each point of its periphery, being substantially equal to but greater than the point on said guide lock bar, which guide point is the most proximate to said opening point.

References Cited
UNITED STATES PATENTS

| | | | |
|---|---|---|---|
| 1,380,835 | 6/1921 | Pecorella et al. | 3—12.5 |
| 1,989,964 | 2/1935 | Beckler | 74—89.22 |
| 2,491,341 | 12/1949 | Tillman | 74—89.22 |
| 2,826,084 | 3/1958 | Turtle | 74—89.22 |
| 3,332,294 | 7/1967 | Suzuki | 74—89.22 |

FRED C. MATTERN, Jr., Primary Examiner

F. D. SHOEMAKER, Assistant Examiner

U.S. Cl. X.R.

3—12.1, 12.5